US006513354B2

(12) United States Patent
Predd et al.

(10) Patent No.: US 6,513,354 B2
(45) Date of Patent: Feb. 4, 2003

(54) DUAL HANDLE LATCH

(75) Inventors: Patrick H. Predd, Wixom, MI (US); Kevin Jordan, Farmington Hills, MI (US)

(73) Assignee: Elco Textron Inc., Rockford, IL (US)

(*) Notice: Subject to any disclaimer, the term of this patent is extended or adjusted under 35 U.S.C. 154(b) by 64 days.

(21) Appl. No.: 09/800,254

(22) Filed: Mar. 6, 2001

(65) Prior Publication Data

US 2001/0045752 A1 Nov. 29, 2001

Related U.S. Application Data

(60) Provisional application No. 60/189,198, filed on Mar. 14, 2000.

(51) Int. Cl.[7] .................................................. B60R 25/02

(52) U.S. Cl. ........................ 70/208; 70/210; 292/336.3; 292/DIG. 31

(58) Field of Search ........................... 70/208–210, 257; 292/DIG. 31, 43, 336.3

(56) References Cited

U.S. PATENT DOCUMENTS 4,917,424 A * 4/1990 Ishihara et al. .......... 292/336.3
5,004,287 A * 4/1991 Doyle ............. 292/DIG. 43 X
5,595,076 A * 1/1997 Weinman et al. ............. 70/208
RE36,209 E * 5/1999 Walls .................. 292/336.3 X
5,987,943 A * 11/1999 Verga et al. .................. 70/208
6,189,400 B1 * 2/2001 Nakagome et al. .. 292/336.3 X
6,209,366 B1 * 4/2001 Zagaroff ....................... 70/208
6,240,752 B1 * 6/2001 Larsen et al. ................. 70/208
6,406,075 B1 * 6/2002 Rice et al. ............... 292/336.3

* cited by examiner

*Primary Examiner*—Suzanne Dino Barrett
(74) *Attorney, Agent, or Firm*—Trexler, Bushnell, Giangiorgi, Blackstone & Marr, Ltd.

(57) ABSTRACT

A latch mechanism which includes two paddles that are engaged by a lock plate. The lock plate is configured to swivel into engagement with lock portions of the paddles, thereby generally locking the paddles in place. Preferably, the lock plate engages a substantial width of the lock portions to avoid creating an undesirable asymmetrical loading condition. As a result of engaging a substantial width of the lock portions of the paddles, the locking of the paddles is robust and reliable. Preferably, the lock portions on the paddles include a retention ramp that engages corresponding structure on the lock plate. The retention ramp renders the engagement between the lock plate and paddles generally more effective. Additionally, preferably the lock plate includes an extending portion that provides a helical ramp which engages a lock assembly, wherein engagement between the lock assembly and helical ramp provides that the lock assembly can be actuated to cause the lock plate to swivel into or out of engagement with the paddles. Preferably, the lock plate is spring biased such that the helical ramp on the extending portion of the lock plate is biased into engagement with the lock assembly.

29 Claims, 17 Drawing Sheets

LOCKED

LOCKED

LOCKED

DUAL HANDLE LATCH

RELATED APPLICATION

This application claims the benefit of U.S. Provisional Application Ser. No. 60/189,198, filed Mar. 14, 2000.

BACKGROUND

The present invention relates generally to latch mechanisms, and relates more specifically to a latch mechanism, such as a latch mechanism for use in connection with a console in a vehicle, where the latch mechanism includes a swiveling lock plate that engages one or more paddles to lock the paddles generally in place.

Latch mechanisms which are used in connection with consoles in vehicles typically provide that a paddle must be actuated (i.e., lifted) to unlatch and open the top of the console to gain access to the console compartment. Some latch mechanisms for vehicle consoles provide two paddles, one over the other, where each paddle can be actuated to gain access to a different compartment in the console. For example, while a bottom paddle may provide access to a lower, larger and deeper compartment in the console, a top paddle may provide access to an upper shallow compartment in the console.

A preferred latch mechanism configuration provides that the paddles can be locked so that a key is needed to unlock the paddles and gain access to the console. Typically, each paddle includes a lock portion which becomes engaged by a cam or tab when the latch mechanism is locked using a key. The cam or tab engages only a portion of the lock portion of the paddle, such as only one side of the lock portion, and therefore locking resistance is provided only on a portion of the lock portion of each paddle. This provides an asymmetrical loading condition, and may cause the paddles to bend or become warped over time. Additionally, as a result of locking only a part of the lock portion, typically the locking mechanism can be readily overpowered merely by applying significant force to one of the paddles.

OBJECTS AND SUMMARY

A general object of an embodiment of the present invention is to provide a latch mechanism which is robust.

A further object of an embodiment of the present invention is to provide a latch mechanism which provides a swiveling lock plate that engages a substantial width, and preferably the entire width, of a lock portion of one or more paddles, thereby providing a generally symmetrical loading condition.

Briefly, and in accordance with at least one of the foregoing objects, an embodiment of the present invention provides a latch mechanism which includes at least one paddle that is engaged by a lock plate. The lock plate is configured to swivel into engagement with a lock portion of the paddle, thereby generally locking the paddle in place. Preferably, the lock plate engages a substantial width of the lock portion of the paddle to avoid creating an undesirable asymmetrical loading condition. As a result of engaging a substantial width of the lock portion, the locking of the paddle is robust and reliable.

Preferably, the lock portion of the paddle includes a retention ramp that engages corresponding structure, such as an inclined surface in a corresponding recess, on the lock plate. The retention ramp renders the engagement between the lock plate and paddle generally more effective. Additionally, preferably the lock plate includes an extending portion that provides a helical ramp which engages a lock assembly, wherein engagement between the lock assembly and helical ramp provides that the lock assembly can be actuated to cause the lock plate to swivel into or out of engagement with the lock portion of the paddle. Preferably, the lock plate is spring biased such that the helical ramp on the extending portion of the lock plate is biased into engagement with the lock assembly. Additionally, preferably the profile of the rear surface of the lock assembly is such that rotation of the lock assembly causes the helical ramp to ride up or down the rear surface of the lock assembly and effect pivoting of the lock plate.

Preferably, the latch mechanism includes two paddles which are configured to engage each other, and the lock plate is configured to engage lock portions on both paddles, thereby locking both paddles generally in place and generally preventing access to the respective console compartments.

BRIEF DESCRIPTION OF THE DRAWINGS

The present invention and the advantages thereof will become more apparent upon consideration of the following detailed description when taken in conjunction with the accompanying drawings of which.

DESCRIPTION

Figure 1:
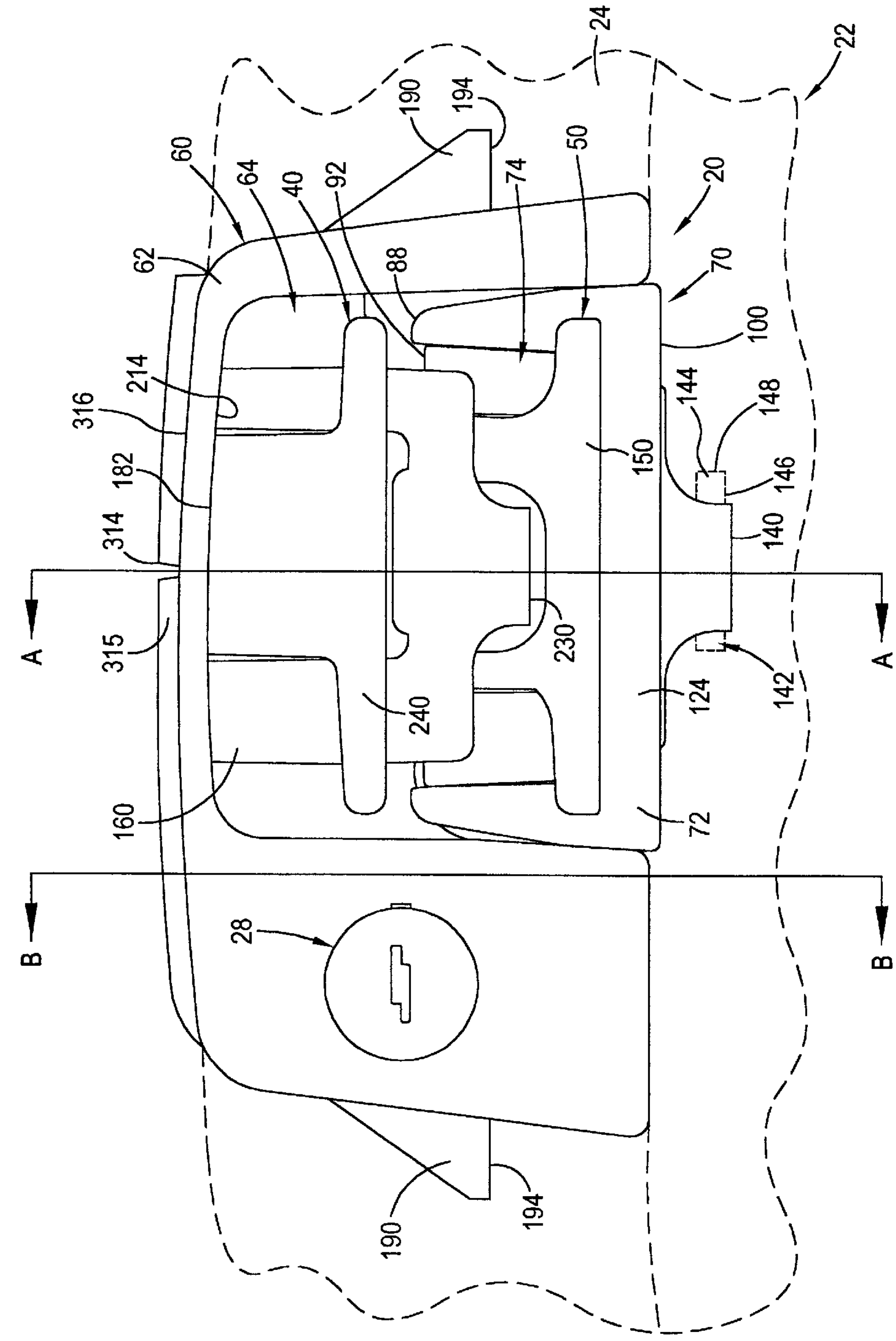
FIG. 1 is a front plan view of a latch mechanism which is in accordance with an embodiment of the present invention.
Figure 8:
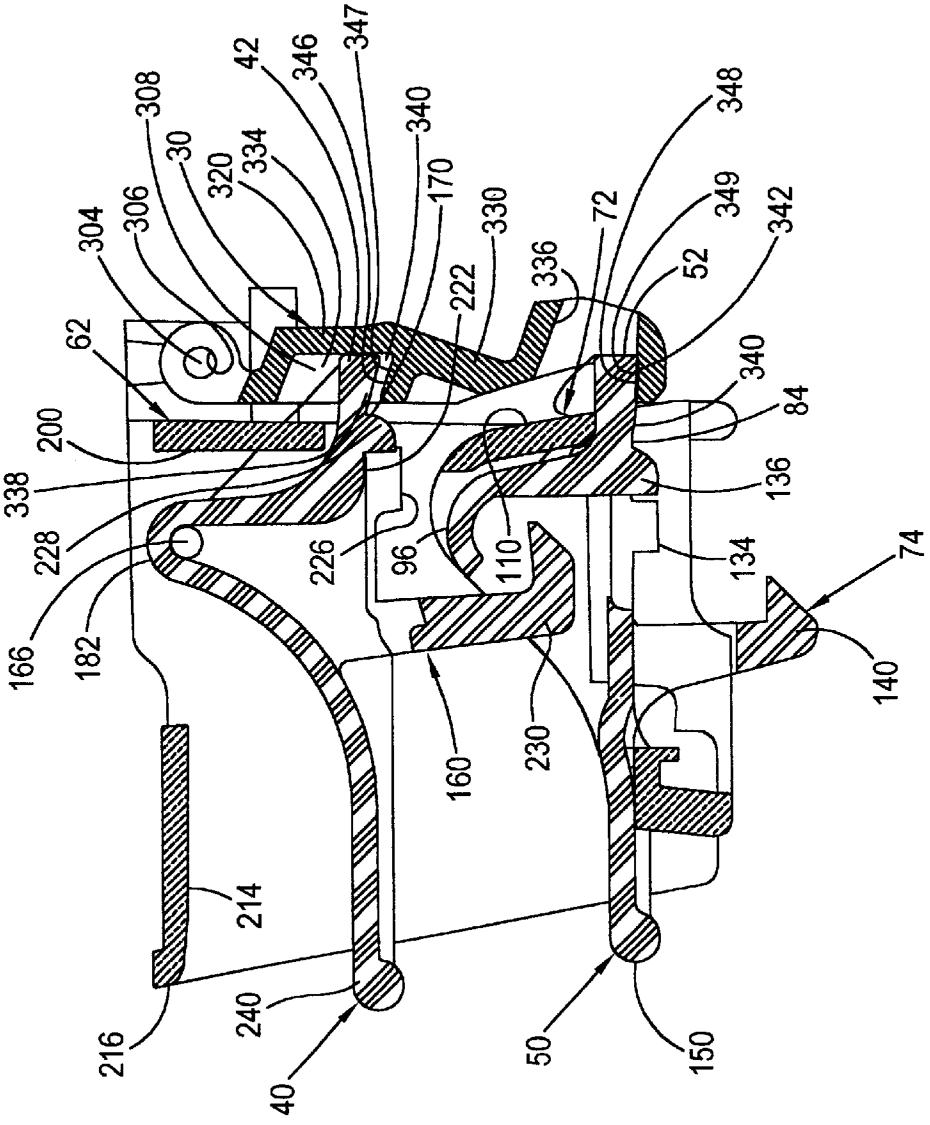
FIG. 8 is a cross-sectional view, taken along line A—A, of the latch mechanism illustrated in FIG. 1, showing the latch mechanism in the locked position.
Figure 9:
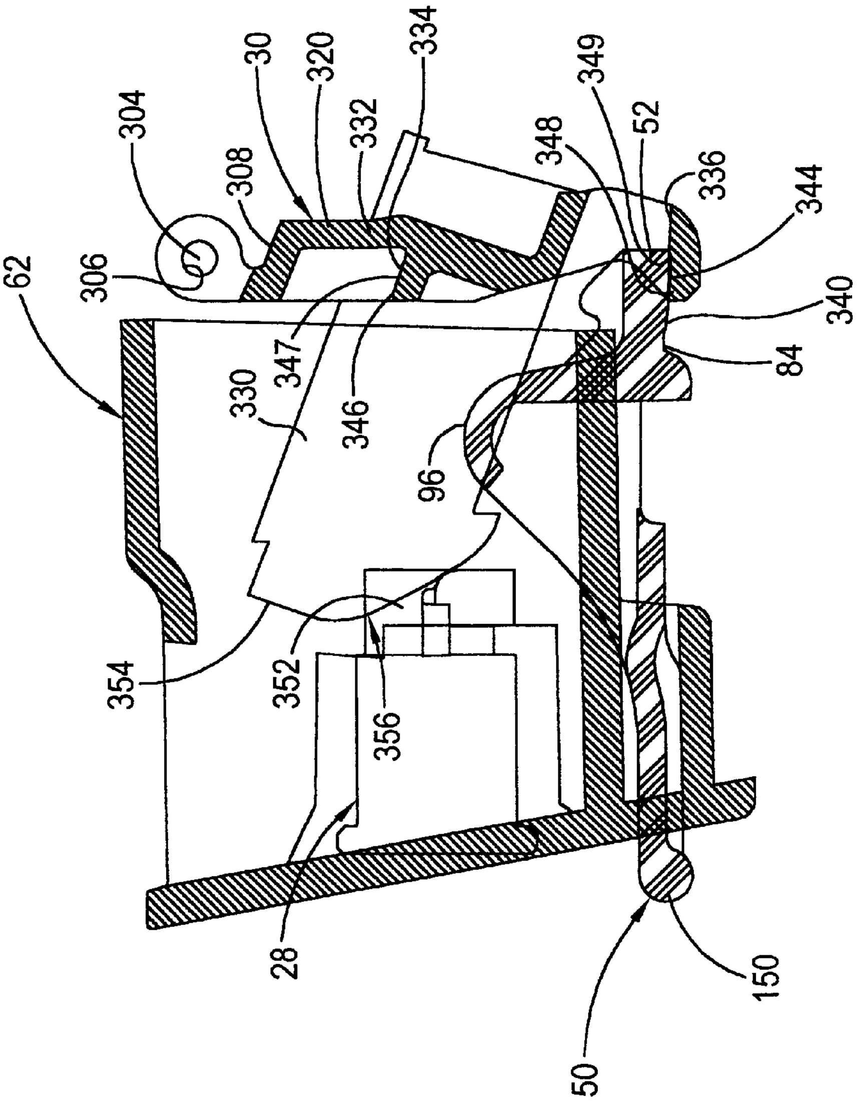
FIG. 9 is a cross-sectional view, taken along line B—B, of the latch mechanism illustrated in FIG. 1, showing the latch mechanism in the locked position.
Figure 10:
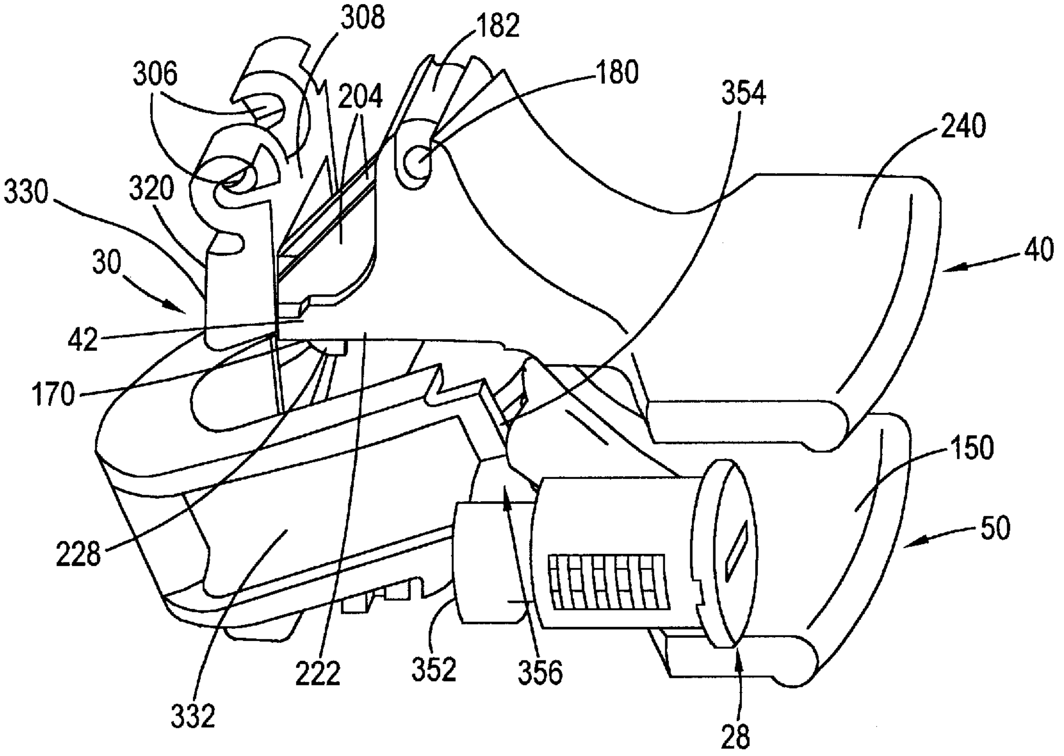
FIG. 10 is a left, perspective view of the latch mechanism illustrated in FIG. 1, showing the latch mechanism in the locked position, and showing the lock plate, an upper paddle, a lower paddle and a lock assembly, but omitting the remainder of the latch mechanism for clarity.
Figure 11:
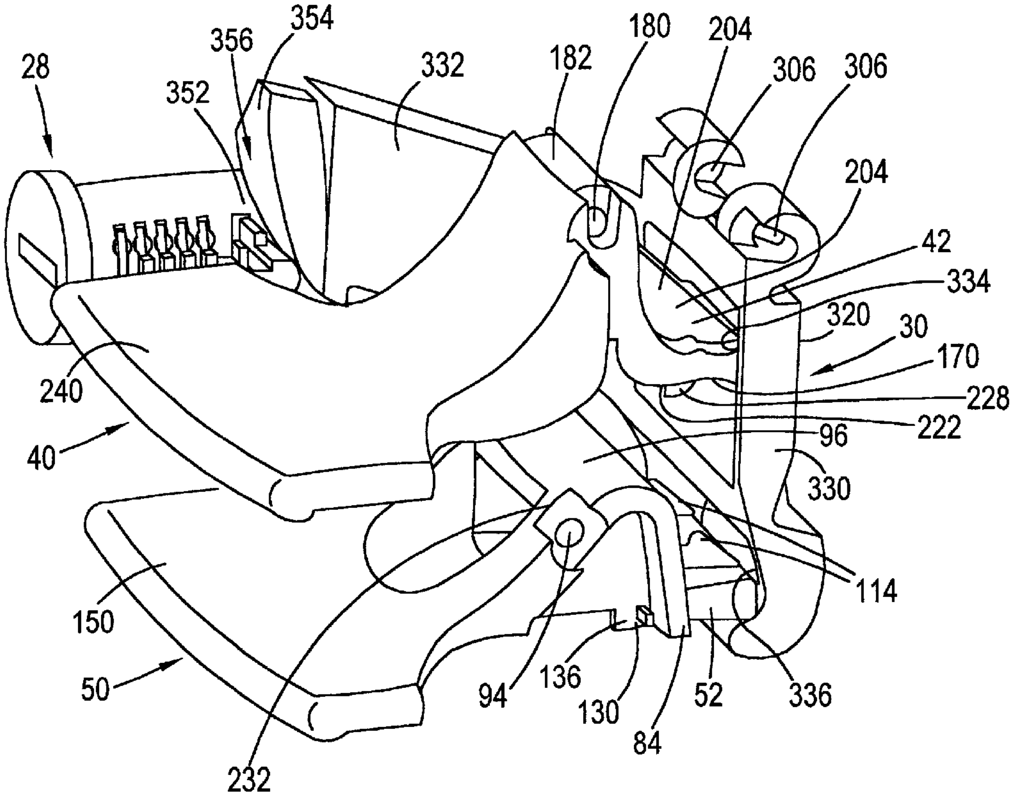
FIG. 11 is a view similar to FIG. 10, but taken from the right side of the latch mechanism.
Figure 12:
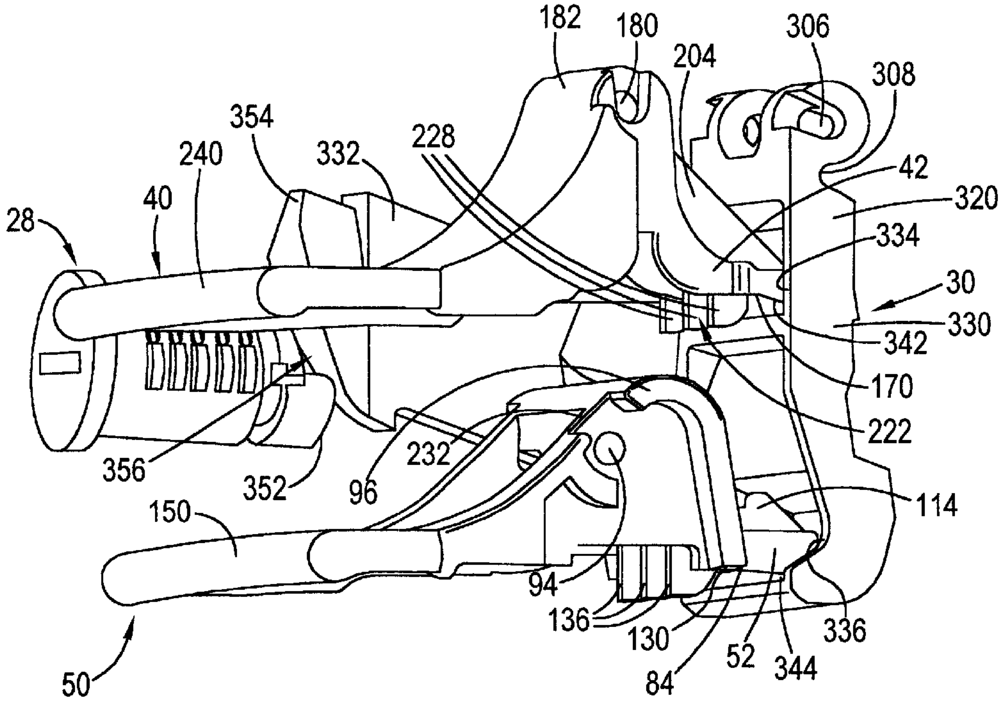
FIG. 12 is a view similar to FIG. 11, but taken from a slightly different angle.
Figure 15:
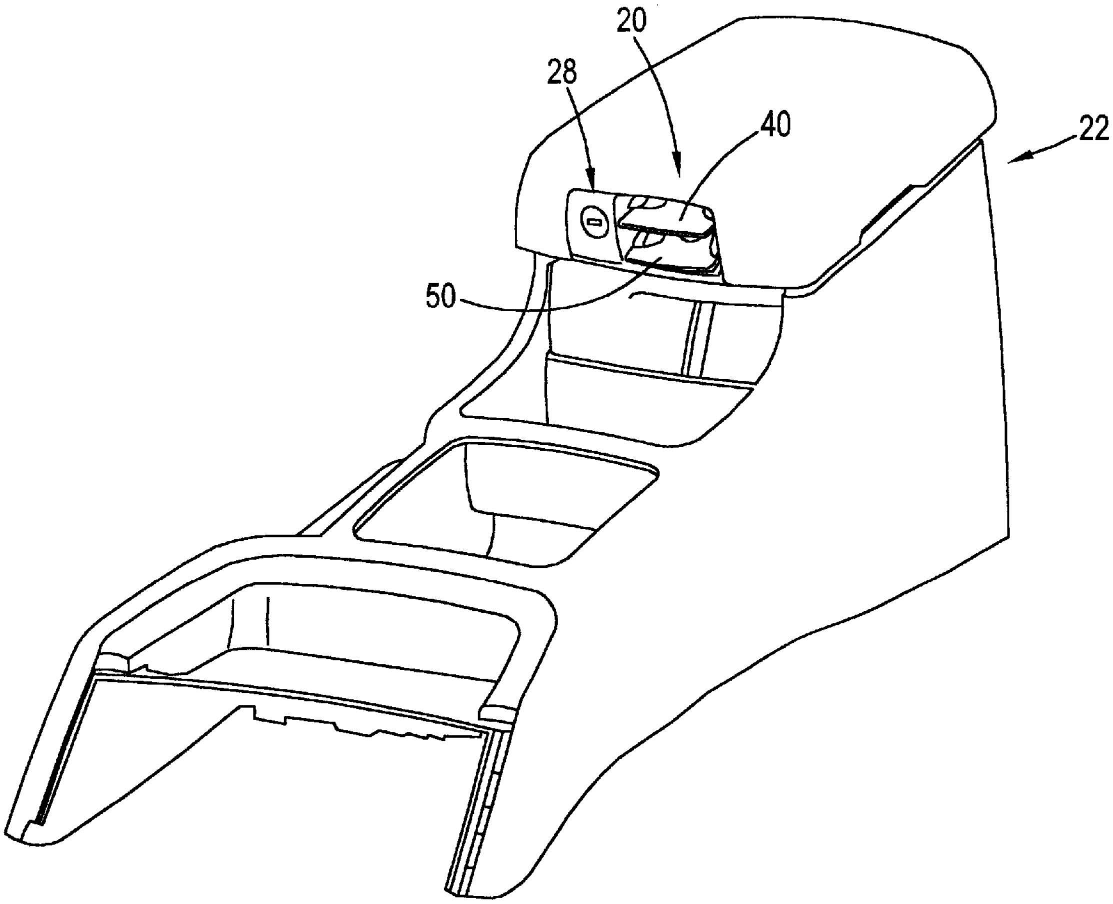
FIG. 15 is a right, perspective view of a console including the latch mechanism shown in the previous FIGURES.
Figure 16:
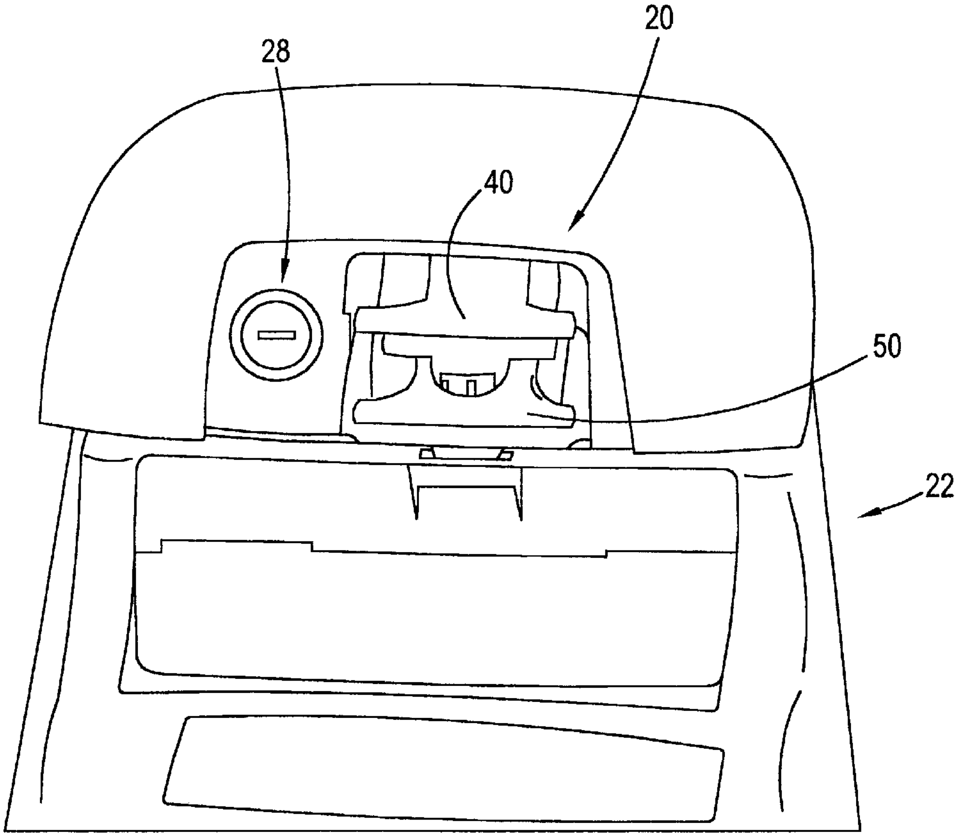
FIG. 16 is a front view of a portion of the console shown in FIG. 15.
Figure 17:
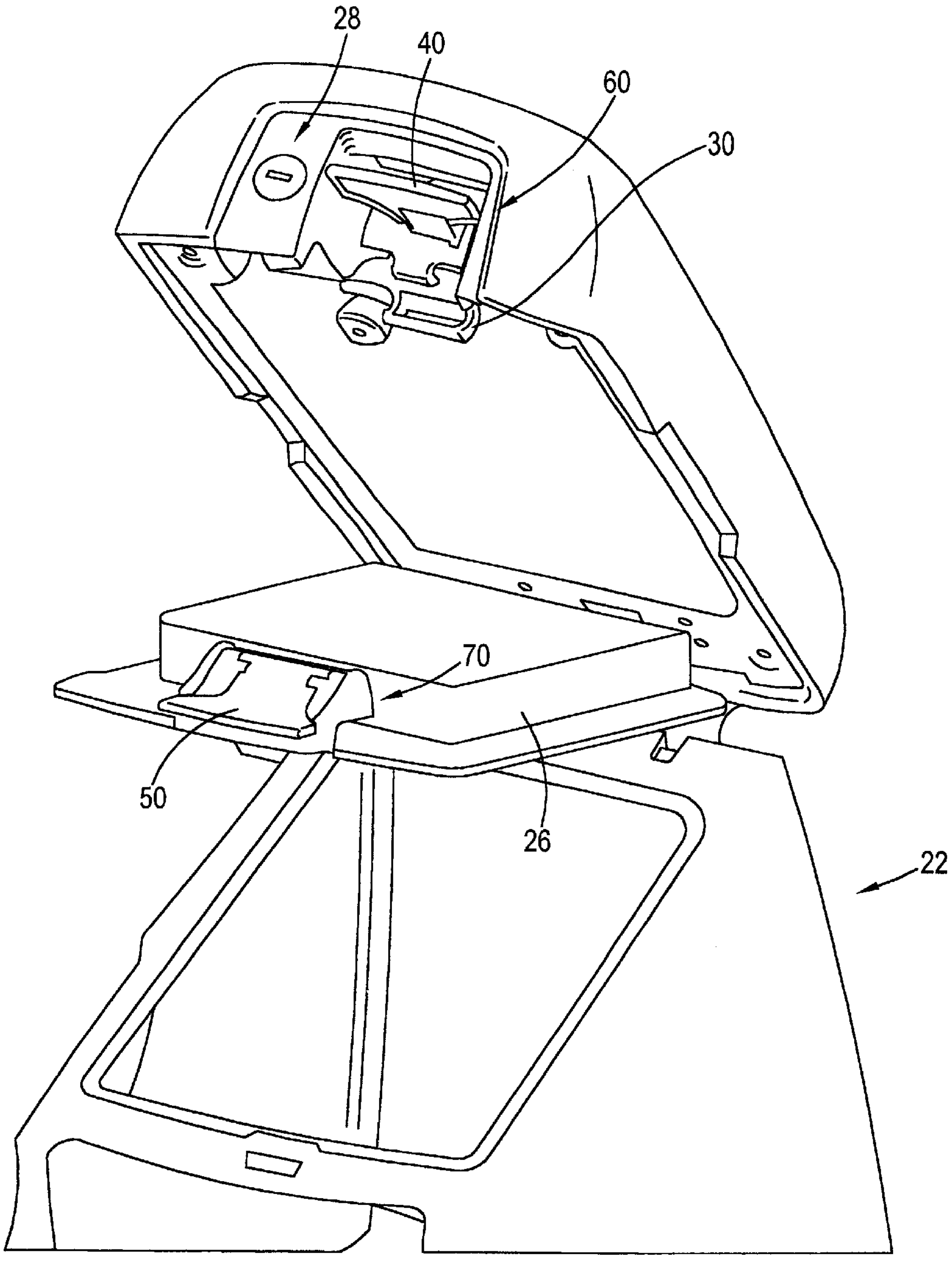
FIG. 17 is view similar to FIG. 15, showing the cover and sub-compartment panel opened, and showing the cover disengaged from the sub-compartment panel.

Illustrated in FIG. 1 is a latch mechanism 20 which is in accordance with an embodiment of the present invention. As shown in FIGS. 15–17, preferably the latch mechanism 20 is connected to a console 22 in a vehicle, and the latch mechanism 20 is configured to latch closed a cover 24 of the console 22 as well as a sub-compartment panel 26 (see FIGS. 15 and 15 as well as FIG. 2) in the console 22. As shown, preferably the latch mechanism 20 includes a lock 28 in which a key (not shown) can be inserted and turned to lock the latch mechanism 20 so that the console 22 cannot be opened without the key. As will be described more fully later herein, when the latch mechanism 20 is locked, a lock plate 30 engages two paddles 40, 50 (see, for example, FIGS. 8, 11 and 12). Preferably, the lock plate 30 engages a substantial width, and preferably the entire width, of lock portions 42, 52 of the two paddles 40, 50. By engaging a substantial width of the lock portions 42, 52 of the paddles 40, 50, the locking feature of latch mechanism 20 is robust and a generally symmetrical loading condition on the paddles 40, 50 is achieved.

Figure 2:
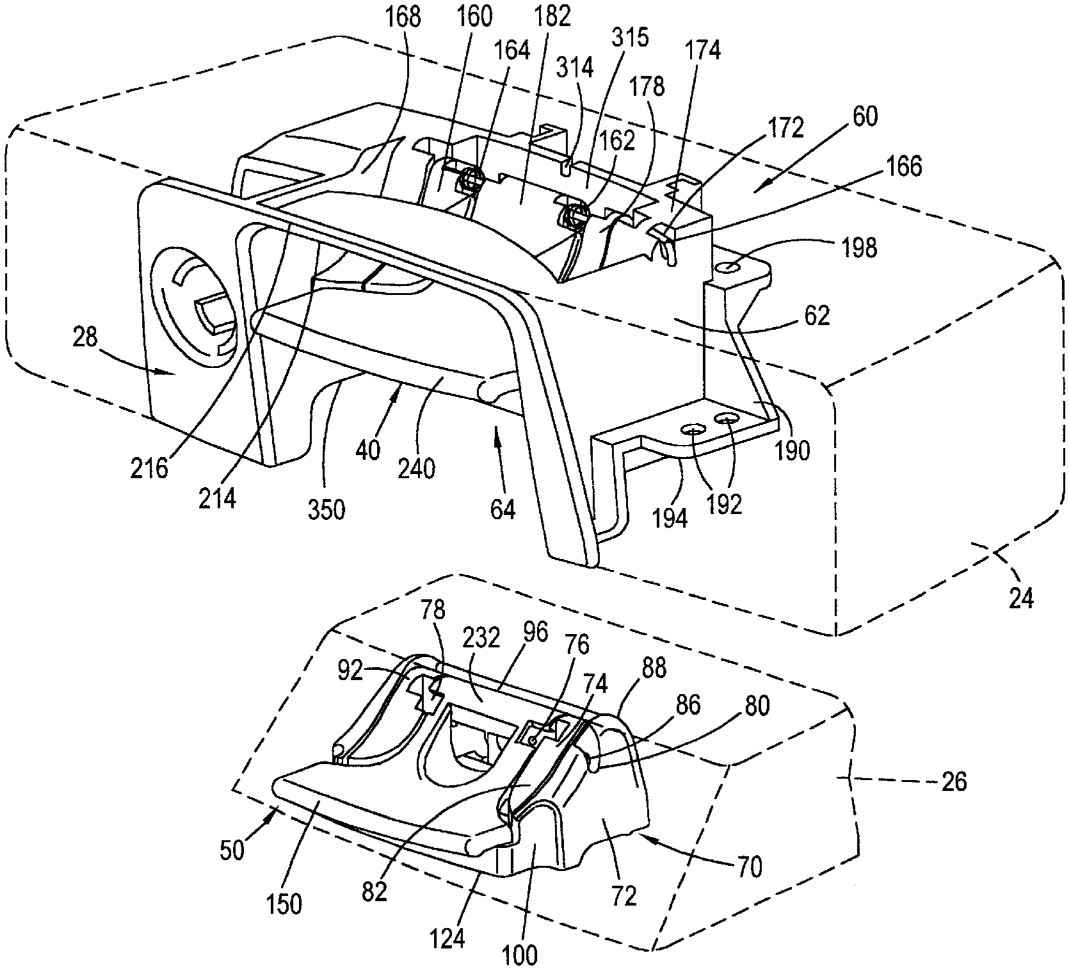
FIG. 2 is a right, front, exploded perspective view of the latch mechanism illustrated in FIG. 1, showing an upper housing assembly exploded away from a lower assembly, and omitting a lock plate for clarity.
Figure 3:
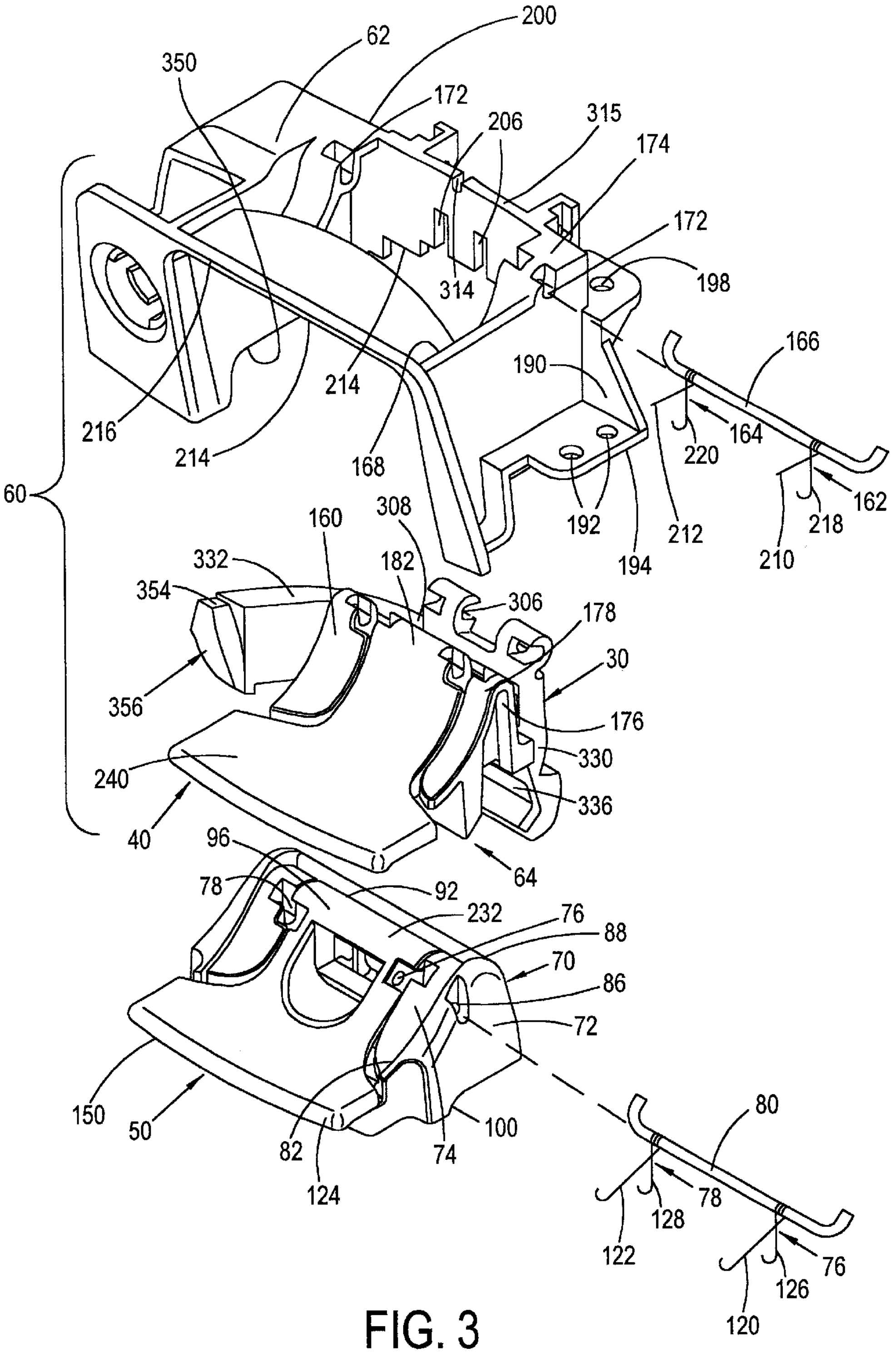
FIG. 3 is a view similar to FIG. 2, but showing explosion of the upper housing assembly, i.e., showing an upper housing exploded away from an upper assembly, and showing the lock plate.
Figure 4:
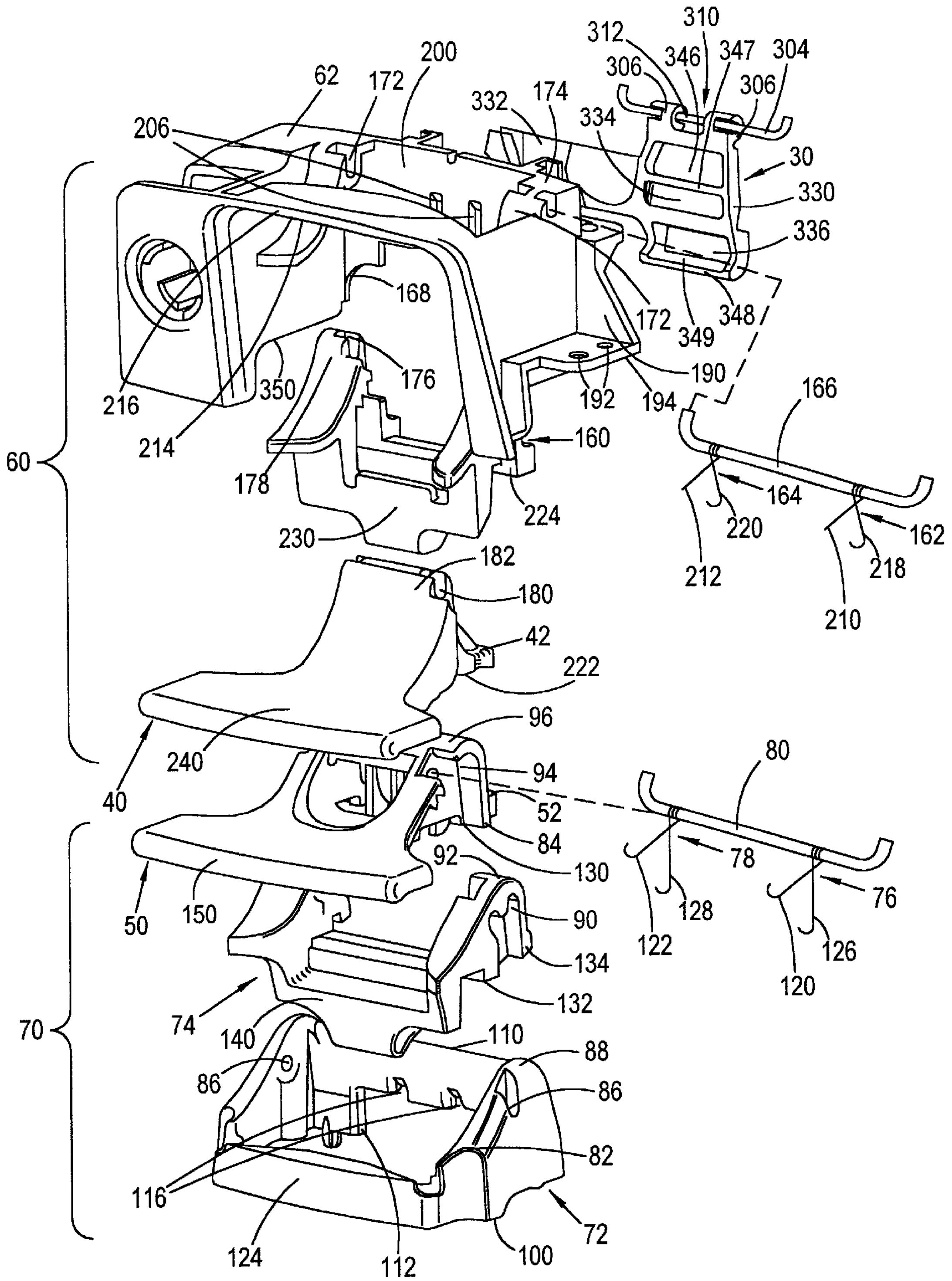
FIG. 4 is a view similar to FIG. 3, but showing explosion of the upper and lower assemblies.
Figure 5:
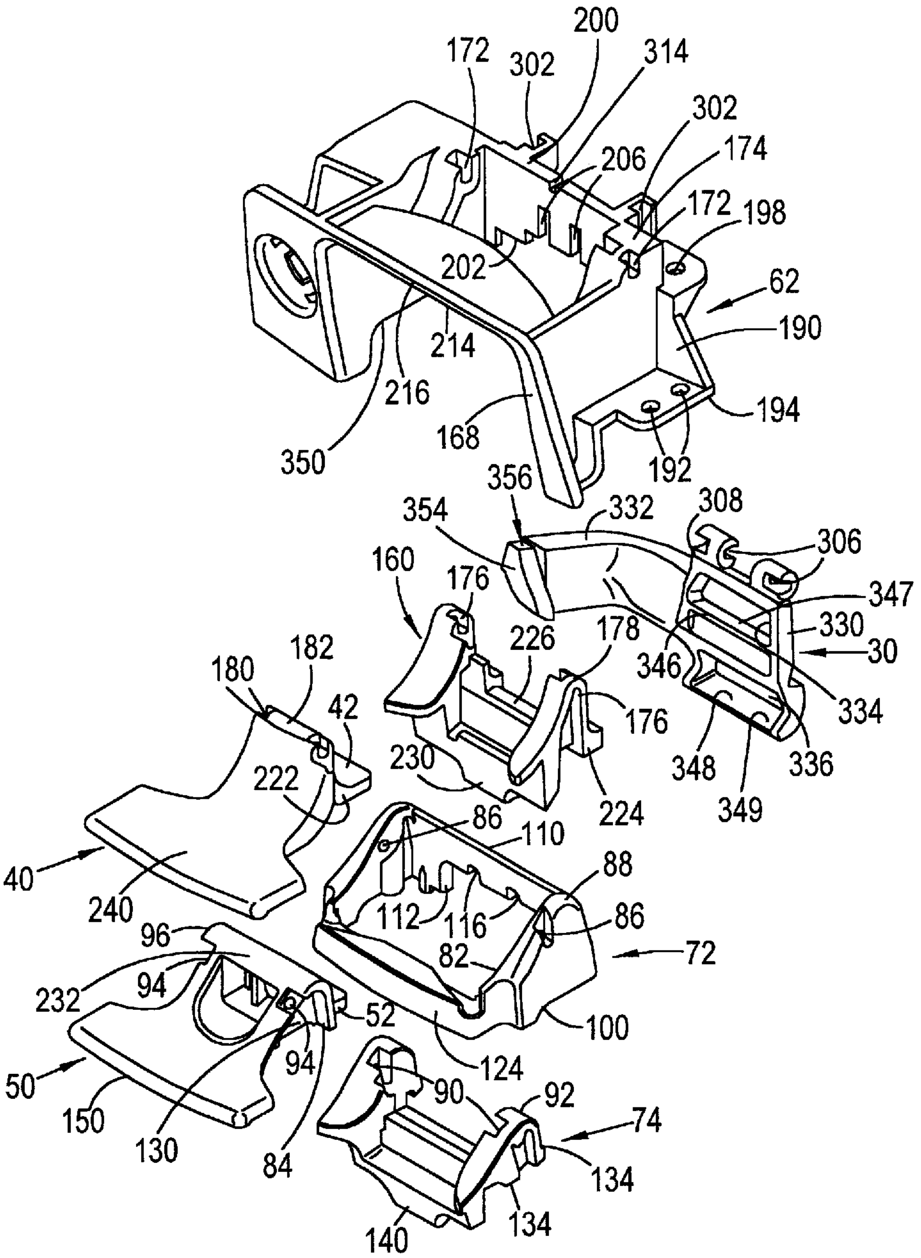
FIG. 5 is a view similar to FIG. 4, but showing the components in a different arrangement of explosion.
Figure 6:
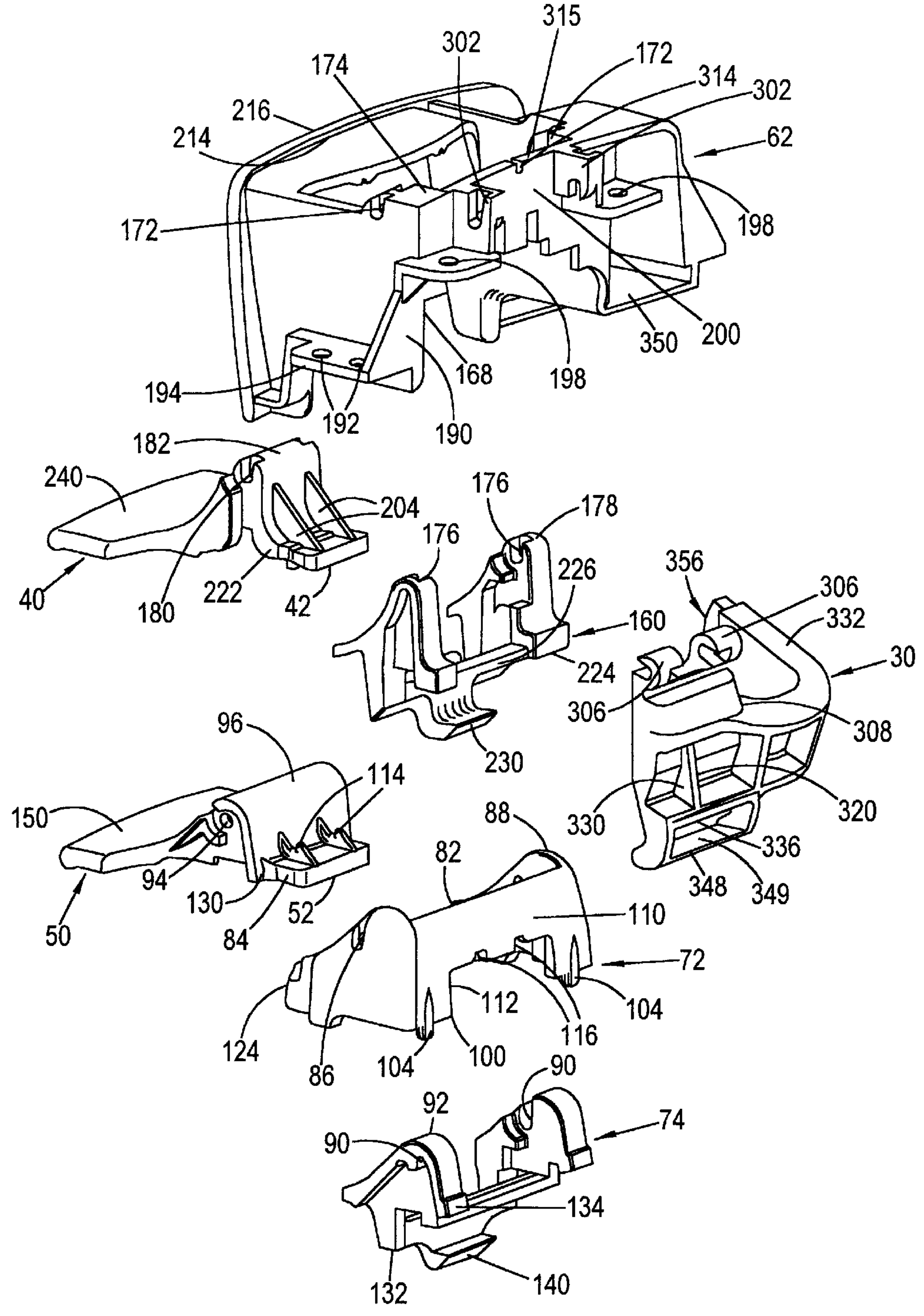
FIG. 6 is a right, rear exploded perspective view of the latch mechanism illustrated in FIG. 1.
Figure 7:
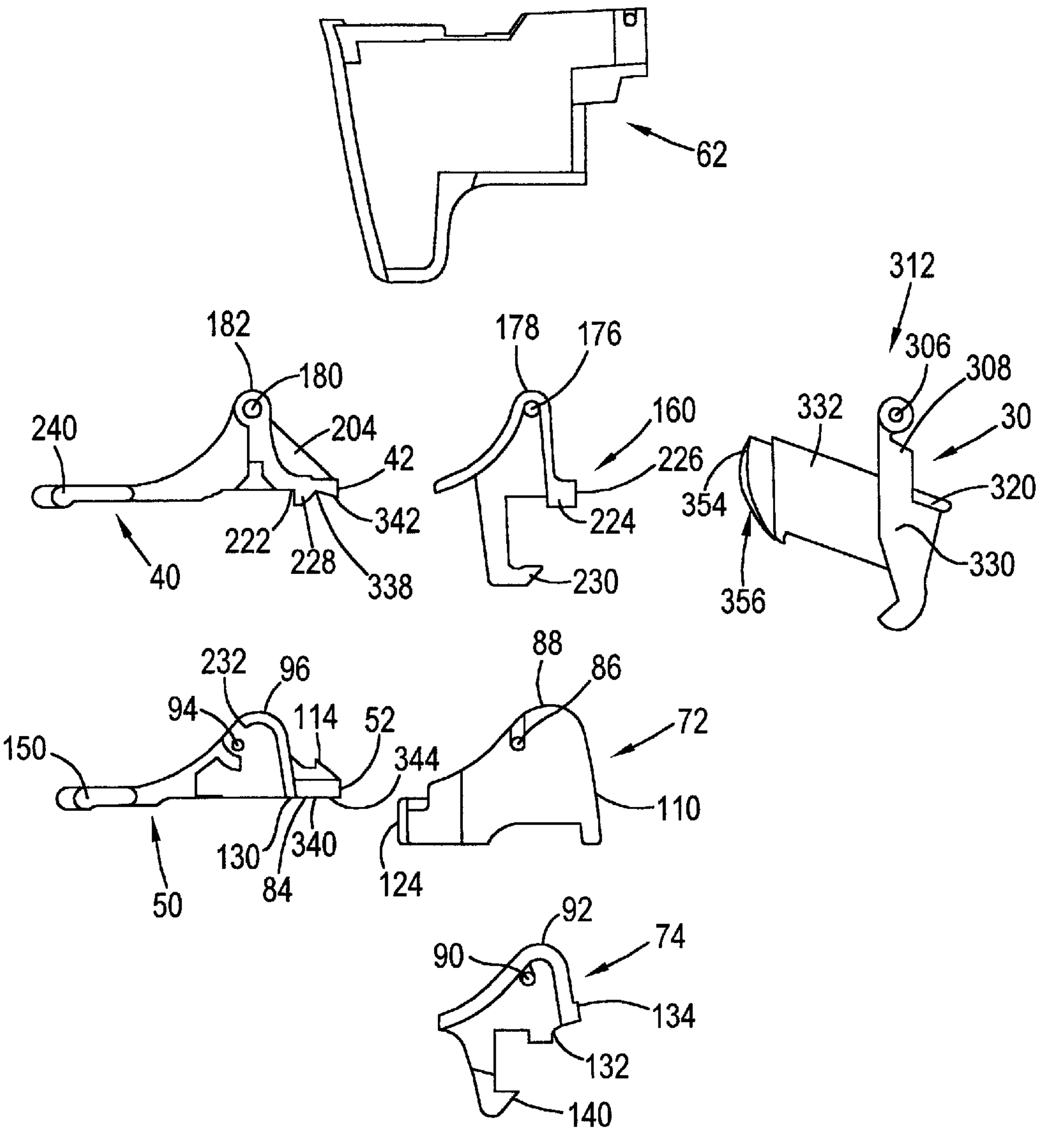
FIG. 7 is a right side, exploded view of the latch mechanism illustrated in FIG. 1.

Specifically, the latch mechanism 20 includes an upper paddle 40 and a lower paddle 50. The upper paddle 40 is a component of an upper housing assembly 60, and the lower paddle 50 is a component of a lower assembly 70. In FIG. 2, the upper housing assembly 60 is shown exploded away from the lower assembly 70. The upper housing assembly 60 includes an upper housing 62 and an upper assembly 64, and in FIG. 3, the upper housing 62 is shown exploded away from the upper assembly 64. While FIG. 2 omits the lock plate 30 for clarity, the lock plate 30 is shown in FIG. 3. FIGS. 4–7 show further explosion of the upper and lower assemblies 64 and 70, respectively.

The lower assembly 70 includes a housing 72, paddle 50, a pawl 74, two torsion springs 76 and 78, and a pin 80. The pin 80 extends through the housing 72, paddle 50, pawl 74 and torsion springs 76, 78 to effectively hold the assembly 70 together. The pin 80 may have bent ends, or may have some other structure, such as a head at one end, which generally prevents the pin 80 from substantially shifting along its longitudinal axis. One having ordinary skill in the art would recognize still other possible configurations for the pin 80. The pin 80 and torsion springs 76, 78 can best be seen in FIGS. 3 and 4, wherein the pin 80 and torsion springs 76, 78 are shown exploded away from the remainder of the lower assembly 70. For clarity, the pin 80 and torsion springs 76, 78 are omitted from most of the remaining FIGURES.

The housing 72 of the lower assembly 70 includes an opening 82 in which the pawl 74 and a rear portion 84 of the paddle 50 sit. The pin 80 extends through holes 86 in an upper portion 88 of the housing 72, as well as through holes 90 in an upper portion 92 of the pawl 74 and holes 94 in an upper portion 96 of the rear portion 84 of the paddle 50. Hence, the pin 80 secures the upper portions 92 and 96 of the pawl 74 and paddle 50 to the housing 72. The pin 80 also carries the torsion springs 76, 78, wherein each spring 76, 78 is disposed between the rear portion 84 of the paddle 50 and the pawl 74 such that there is a spring 76, 78 disposed adjacent each side of the paddle 50.

Preferably, the housing 72 of the lower assembly 70 is secured to the sub-compartment panel 26 (see FIGS. 2 and 17) in the console 22 of a vehicle. Specifically, a bottom surface 100 of the housing 72 may include a pair of holes (not visible in the FIGURES) for receiving securing members (not shown), as well as include a pair of protrusions 104 which are configured to be received in corresponding recesses or holes (not shown) in the sub-compartment panel 26.

Preferably, a rear wall 110 of the housing 72 includes a cut-out 112 for receiving the lock portion 52 of the paddle 50. As shown, the lock portion 52 is disposed at the rear portion 84 of the paddle 50. The lock portion 52 may include a pair of upward-extending walls 114 which are received by a corresponding pair of notches 116 on the rear wall 110 of the housing 72, adjacent the cut-out 112.

Preferably, each torsion spring 76, 78 has an end 120, 122 which is retained against a front portion 124 of the bottom surface 110 of the housing 72. Preferably, recesses (not shown) are provided on the bottom surface 110 of the front portion 124 of the housing 72 for receiving the ends 120, 122 of the torsion springs 76, 78. An opposite end 126 of the right-most torsion spring 76 is preferably retained against a bottom surface 130 of the rear portion 84 of the paddle 50, while an opposite end 128 of the left-most torsion spring 78 is preferably retained against a bottom surface 132 of the pawl 74. While the right-most torsion spring 76 biases the lock portion 52 of the paddle 50 into engagement with the rear wall 110 of the housing 72, adjacent the cutout 112, the left-most torsion spring 78 biases a rear wall 134 of the pawl 74 into engagement with a plurality of parallel retaining walls 136 on the rear portion 84 of the paddle 50 (see, for example, FIGS. 8 and 13).

The pawl 74 includes a hook or latch portion 140 which is configured to engage corresponding structure 142 (see FIG. 1) in the console 22 to latch closed the sub-compartment panel 26 (to which the lower assembly 70 is attached). The corresponding structure 142 in the console may comprise an angled wall 144 defining a lip 146 at its lower end 148. Providing an angled wall 144 effectively provides that, as the sub-compartment panel 26 is closed, the hook or latch portion 140 of the pawl 72 rides along the angled wall 144 in the console 22 and becomes hooked or latched under the lip 146 provided at the lower end 148 of the angled wall 144. Hence, the sub-compartment panel 26 becomes latched. As the hook or latch portion 140 of the pawl 74 rides along the angled wall 144 in the console 22 as the sub-compartment panel 26 is closed, the pawl 74 pivots generally independent of the paddle 50, and the left-most torsion spring 76 provides that the hook or latch portion 140 of the pawl 74 is biased into contact with the angled wall 144. When the hook or latch portion 140 has moved sufficiently along the angled wall 144 such that the hook or latch portion 140 communicates with the lip 146, the left-most torsion spring's (78's) biasing of the pawl 74 causes the hook or latch portion 140 to hook under the lip 146, latching the sub-compartment panel 26 closed.

The engagement between the retaining walls 136 at the rear portion 84 of the paddle 50 and the rear wall 134 of the pawl 74 provides that when the sub-compartment panel 26 is latched closed, and a handle portion 150 of the paddle 50 is lifted upward (when the latch mechanism 20 is unlocked), the resulting movement of the paddle 50 causes the pawl 74 to pivot along with the paddle 50, thereby causing the hook or latch portion 140 of the pawl 74 to unlatch from the corresponding latch structure 142 (e.g., the lip 146) in the console 22. As a result, the sub-compartment panel 26 can be lifted upward (along with the console cover 24) to obtain access to the lower compartment in the console 22 (see FIG. 17).

The upper housing assembly 60 is similar to the lower assembly 70 and includes upper housing 62, paddle 40, a pawl 160, two torsion springs 162, 164, and a pin 166 which extends through the housing 62, paddle 40, pawl 160 and torsion springs 162, 164 to effectively hold the assembly 60 together. The pin 166 may have bent ends, or may have some other structure, such as a head at one end, which generally prevents the pin 166 from substantially shifting along its longitudinal axis. One having ordinary skill in the art would recognize still other possible configurations for the pin. The pin 166 and torsion springs 162, 164 can best be seen in FIGS. 3 and 4, wherein the pin 166 and torsion springs 162, 164 are shown exploded away from the upper housing assembly 60. For clarity, the pin 166 and torsion springs 162, 164 are omitted from most of the remaining FIGURES.

The upper housing 62 includes an opening 168 in which the pawl 160 and a rear portion 170 of the paddle 40 sit. The pin 166 extends through holes 172 in an upper portion 174 of the housing 62, as well as through holes 176 in an upper portion 178 of the pawl 160 and holes 180 in an upper portion 182 of the paddle 40. Hence, the pin 166 secures the upper portions 178 and 182 of the pawl 160 and paddle 40 to the housing 62. The pin 166 also carries the torsion springs 162, 164, wherein each spring is disposed between the rear portion 170 of the paddle 40 and the pawl 160 such that there is a spring 162, 164 disposed adjacent each side of the paddle 40.

Preferably, the upper housing 62 is secured to the cover 24 of the vehicle console. Specifically, the upper housing 62 may include arms 190 which generally extend outward, and each may include one or more holes 192 for receiving securing members (not shown). Preferably, a protrusion (not visible from the FIGURES) is provided on the bottom surface 194 of each arm 190 for receipt in a corresponding recess or hole (not shown) provided in the console cover 24. Preferably, holes 198 are also provided at the rear of the upper housing 62 for receiving securing members (not shown) for attachment to the console cover 24.

Preferably, a rear wall 200 of the housing 62 includes a cut-out 202 for receiving the lock portion 42 of the paddle 40. As shown, the lock portion 42 is disposed at the rear portion 170 of the paddle 40. The lock portion 42 may include a pair of upward-extending walls 204 which are received by a corresponding pair of notches 206 in the rear wall 200 of the housing 62.

Preferably, each torsion spring 162, 164 includes an end 210, 212 which is retained against a bottom surface 214 of a front portion 216 of the housing 62. Preferably, channels (not visible from the FIGURES) are provided on the bottom surface 214 of the housing 62 for receiving the ends 210, 212 of the torsion springs 162, 164. An opposite end 218 of the right-most torsion spring 162 is preferably retained against a bottom surface 222 of the rear portion 170 of the paddle 40, while an opposite end 220 of the left-most torsion spring 164 is preferably retained against a bottom surface 224 of the pawl 160. While the right-most torsion spring 162 biases the lock portion 42 of the paddle 40 into engagement with the rear wall 200 of the housing 62, the left-most torsion spring 164 biases a rear wall 226 of the pawl 160 into engagement with a plurality of parallel retaining walls 228 on the rear portion 170 of the paddle 40 (see, for example, FIGS. 8 and 13).

The pawl 160 includes a hook or latch portion 230 which is configured to engage the pin 80 in the lower assembly 70. Preferably, the upper portion 182 of the lower paddle 50 includes an angled wall 232. Providing an angled wall 232 on the upper portion 182 of the lower paddle 50 provides that, as the console cover 24 is closed, the hook or latch portion 230 of the pawl 160 rides along the angled wall 232 and becomes hooked or latched under the pin 80 in the lower assembly 70. As the hook or latch portion 230 of the pawl 160 rides along the angled wall 232 on the upper portion 182 of the lower paddle 50, the pawl 160 pivots generally independent of the paddle 40, and the left-most torsion spring 164 provides that the hook or latch portion 230 of the pawl 160 is biased into contact with the angled wall 232. When the hook or latch portion 230 has moved sufficiently along the angled wall 232 such that the hook or latch 230 portion clears the pin 80, the left-most torsion spring's (164's) biasing of the pawl 160 causes the hook or latch portion 230 to hook under the pin 80, latching the console cover 24 closed.

The engagement between the retaining walls 228 at the rear portion 170 of the paddle 40 and the rear wall 226 of the pawl 160 provides that when the console cover 24 is latched closed, and a handle portion 240 of the upper paddle 40 is lifted upward (when the latch mechanism 20 is unlocked), the resulting movement of the paddle 40 causes the pawl 160 to pivot along with the paddle 40, thereby causing the hook or latch portion 230 of the pawl 160 to unlatch from the pin 80 in the lower assembly 70. As a result, the console cover 24 can be lifted upward to obtain access to the upper compartment in the console 22.

A lock plate 30 is pivotally attached to the upper housing 62. Specifically, the upper housing 62 includes a pair of holes 302 which receive a pin 304, and the pin 304 extends through holes 306 provided in an upper portion 308 of the lock plate 30. Hence, the pin 304 effectively secures the lock plate 30 to the rear portion 300 of the housing 62 such that the lock plate 30 can pivot generally along the longitudinal axis of the pin 304. The pin 304 also carries a torsion spring 310 (see FIG. 4) which effectively biases the lock plate 30 forward, toward the lock portions 42, 52 of the paddles 40, 50. Specifically, one end 312 of the spring 310 engages a notch 314 in a wall 315 on the upper surface 316 of the upper housing 62, and an opposite end of the spring 310 engages a rear surface 320 of the lock plate 30. Like the two other pins 80, 166 described above, pin 304 may have bent ends, or may have some other structure, such as a head at one end, which generally prevents the pin 304 from substantially shifting along its longitudinal axis. One having ordinary skill in the art would recognize still other possible configurations for the pin 304.

The lock plate 30 includes a body portion 330 and an extending portion 332 that generally extends from the body portion 330. The body portion 330 provides recesses 334, 336 for receiving the lock portions 42, 52 of the paddles 40, 50. When the latch mechanism 20 is locked, the lock plate 30 is pivoted forward, and the recesses 334, 336 in the lock plate 30 engage the lock portions 42, 52 of the paddles 40, 50. In contrast, when the latch mechanism 20 is unlocked, the lock plate 30 is pivoted backward, and the recesses 334, 336 in the lock plate 30 are disengaged from the lock portions 42, 52 of the paddles 40, 50. When the recesses 334, 336 of the lock plate 30 engage the lock portions 42, 52 of the paddles 40, 50, the paddles 40, 50 become generally locked in place until the lock plate 30 is pivoted such that the recesses 334, 336 disengage from the lock portions 42, 52 of the paddles 40, 50. To provide enhanced engagement between the lock portions 42, 52 of the paddles 40, 50 and the recesses 334, 336 in the lock plate 30, a lower surface 338, 340 of each lock portion 42, 52 of each paddle 40, 50 provides a retaining ramp or inclined surface 342, 344, and the lower wall 346, 348 of each of the recesses 334, 336 is provided with a corresponding inclined surface 347, 349. Engagement between the retaining ramps 342, 344 of each of the lock portions 42, 52 of the paddles 40, 50 and the inclined surfaces 347, 349 in the recesses 334, 336 provides enhanced engagement between the lock portions 42, 52 of the paddles 40, 50 and the body portion 330 of the lock plate 30.

As mentioned, the lock plate 30 includes an extending portion 332 that generally extends from the body portion 330. The extending portion 332 extends into a channel 350 in the upper housing 62 and contacts a rear surface 352 (see, for example, FIGS. 9–12 and 14) of a lock assembly 28 which is mounted to the upper housing 62. Specifically, an end surface 354 of the extending portion 332 contacts the rear surface 352 of the lock assembly 28. Preferably, the end surface 354 of the extending portion 332 of the lock plate 30 has a helical ramp profile 356, and preferably a profile of the rear surface 352 of the lock assembly 28 is such that rotation of the rear surface 352 of the lock assembly 28 causes the helical ramp 356 to ride up (see FIGS. 9–12) or down (see FIG. 13) the rear surface 352 and effect pivoting of the lock plate 30. Hence, the helical ramp 356 provides that when the appropriate key is inserted in the key hole of the lock assembly 28, and the key is turned, the rear surface 352 of the lock assembly 28 rotates causing the helical ramp 356 to move along the rear surface 352 of the lock assembly 28. Movement of the helical ramp 356 along the rear surface 352 of the lock assembly 28 causes the lock plate 30 to pivot (compare FIG. 9 to FIG. 14, for example). Specifically, when the key is rotated in one direction, the lock plate 30 pivots toward the lock portions 42, 52 of the paddles 40, 50, and the recesses 334, 336 in the body portion 330 of the lock plate 30 engage the lock portions 42, 52 of the paddles 40, 50. Hence, the latch mechanism 20 is placed in the locked position and the handle portions 150, 240 of the paddles 40, 50 cannot be actuated to unlatch the latch or hook portions 140, 230 of the pawls 74, 160. Subsequently, when the key is rotated in the opposite direction, the lock plate 30 pivots generally away from the lock portions 42, 52 of the paddles 40, 50, and the recesses 334, 336 in the body portion 330 of the lock plate 30 disengage the lock portions 42, 52 of the paddles 40, 50. As a result, the handle portion 150, 240 of either paddle 40, 50 can be actuated (i.e., lifted upward) to unlatch the respective latch or hook portion 140, 230 of the respective pawl 74, 160. As mentioned above, a helical spring 310 is provided between the lock plate 30 and upper housing 62. Hence, the helical ramp 356 on the end surface 354 of the extending portion 332 is biased into contact with the rear surface 352 of the lock assembly 28.

Preferably, all the components of the latch mechanism 20, except the pins 80, 166, 304 and springs 76, 78, 162, 164, 310 are made of plastic, while the pins 80, 166, 304 and springs 76, 78, 162, 164, 310 are preferably made of metal.

Although operation of the latch mechanism 20 has been described briefly above in connection with a description of the structure of the latch mechanism 20, operation of the latch mechanism 20 will now be described in detail. Initially, the latch mechanism 20 may be in the locked position (see, for example, FIGS. 8–12, 15 and 16). In the locked position, the hook or latch portion 140 of the pawl 74 of the lower assembly 70 is engaged with the corresponding structure 142 in the console, and the hook or latch portion 230 of the pawl 160 of the upper assembly 60 is engaged with the pin 80 of the lower assembly 70. Additionally, the body portion 330 of the lock plate 30 is engaged with the lock portions 42, 52 of the paddles 40, 50. Specifically, the recesses 334, 336 on the body portion 330 are engaged with the lock portions 42, 52 of the paddles 40, 50. The engagement between the lock portions 42, 52 of the paddles 40, 50 and the recesses 334, 336 in the lock plate 30 provides that the paddles 40, 50 are generally locked in place and cannot be actuated (i.e., lifted upward) to obtain access to the console 22. At such time, the lock assembly 28 is in a position such that the rear surface 352 of the lock assembly 28 contacts a lower portion of the helical ramp 356 provided on the end surface 354 of the extending portion 332 of the lock plate 30, thereby providing that the lock plate 30 is pivoted forward and the recesses 334, 336 on the body portion 330 of the lock plate 30 are engaged with the lock portions 42, 52 of the paddles 40, 50.

Figure 13:
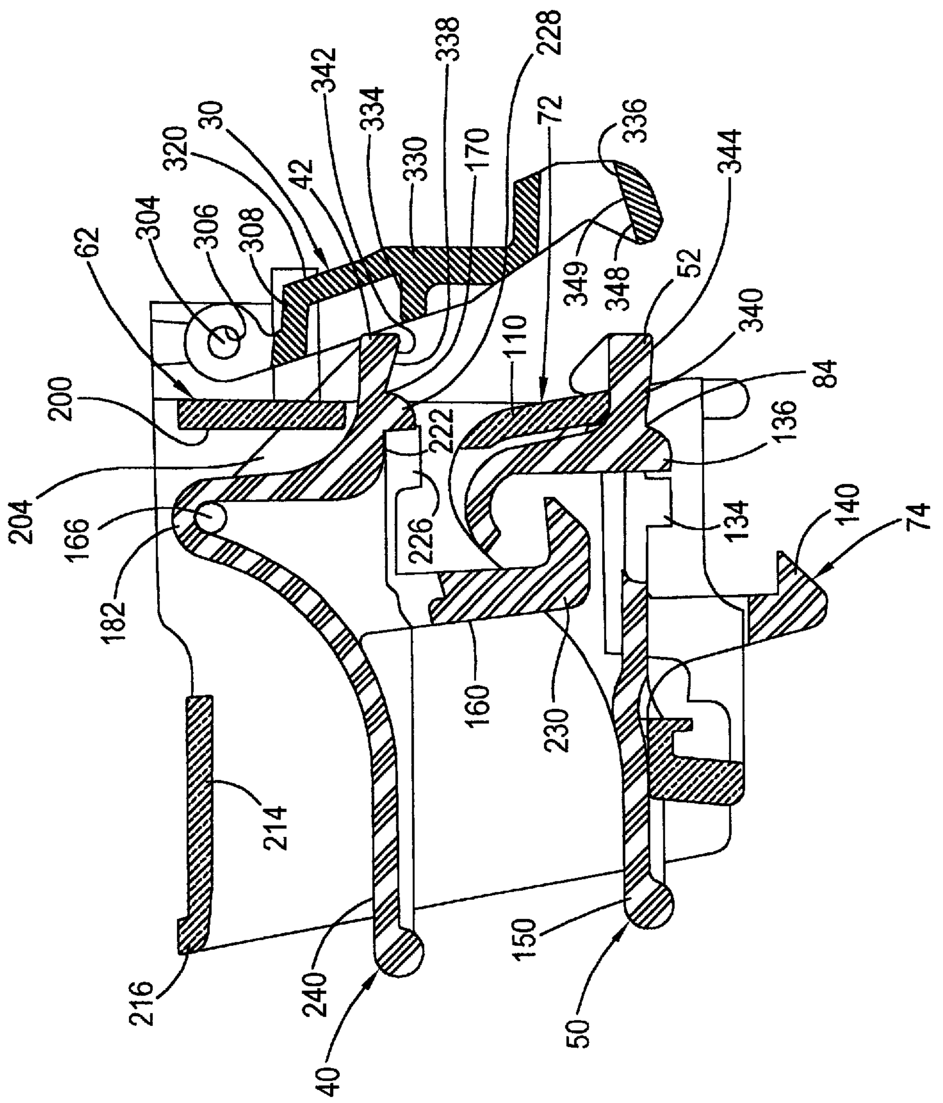
FIG. 13 is a cross-sectional view, taken along line A—A, of the latch mechanism illustrated in FIG. 1, showing the latch mechanism in the unlocked position.
Figure 14:
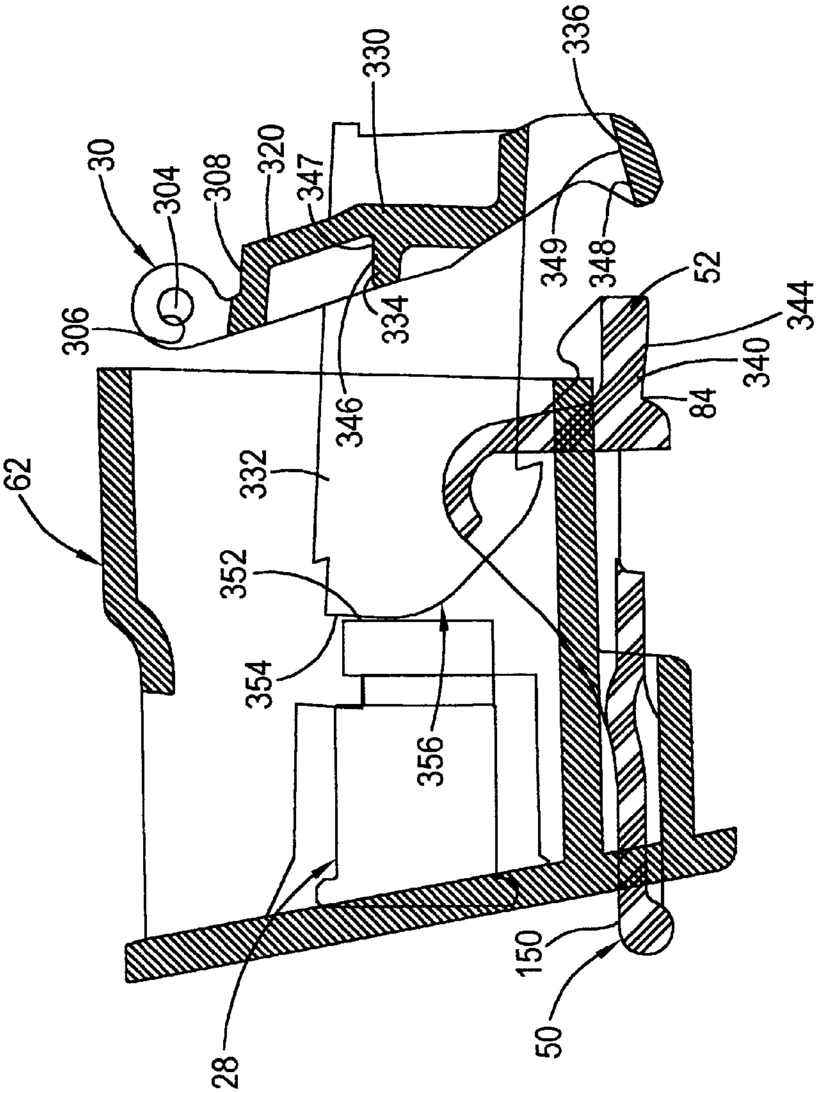
FIG. 14 is a cross-sectional view, taken along line B—B, of the latch mechanism illustrated in FIG. 1, showing the latch mechanism in the unlocked position.

To unlock the latch mechanism 20, the appropriate key is inserted in the key hole of the lock assembly 28, and the key is turned. This causes the rear surface 352 of the lock assembly 28 to rotate, thereby causing the helical ramp 356 on the end surface 354 of the extending portion 332 of the lock plate 30 to ride down the surface 352. As shown in FIGS. 13 and 14, this causes the lock plate 30 to pivot backward, causing the recesses 334, 336 in the body portion 330 of the lock plate 30 to disengage from the lock portions 42, 52 of the paddles 40, 50. After the lock plate 30 has been pivoted out of engagement with the lock portions 42, 52 of the paddles 40, 50, the paddles 40, 50 can be actuated (i.e., lifted upward) to unlatch the console cover 24, and possibly also the sub-compartment panel 26.

Specifically, lifting up on the handle portion 240 of the top paddle 40 causes the latch or hook portion 230 of the top pawl 160 to disengage from the pin 80 of the lower assembly 70. Hence, the console cover 24 is unlatched, and can be pivoted to the open position, thereby providing access to the upper compartment of the console 22 (see FIG. 17). Subsequently, should the console cover 24 be closed, the latch or hook portion 230 of the pawl 160 contacts and slides along the inclined surface 232 provided on the upper portion 182 of the lower paddle 50, until the hook or latch portion 230 hooks under the pin 80 of the lower assembly 70. Hence, the console cover 24 is again latched closed.

Lifting up on the handle portion 150 of the lower paddle 50 causes the latch or hook portion 140 of the lower pawl 74 to disengage from the corresponding latching structure 142 (e.g., the inclined surface 144 and lip 146) provided in the console 22. Hence, the sub-compartment panel 26 to which the lower assembly 70 is attached, is unlatched, and can be pivoted to the open position, thereby providing access to the lower compartment of the console 22 (see FIG. 17). Subsequently, should the console cover 24 and/or sub-compartment panel 26 be closed, the latch or hook portion 140 of the lower pawl 74 contacts and slides along the inclined surface 144 provided in the console 22, until the hook or latch portion 140 hooks under the corresponding latching structure 142 in the console 22. Hence, the sub-compartment panel 26 is again latched closed.

The latch mechanism 20 can be placed in the locked position either while the sub-compartment panel 26 and console cover 24 are pivoted into the upward position, or while the sub-compartment panel 26 and console cover 24 are pivoted into the downward position (i.e., while latched closed). Regardless, to lock the latch mechanism 20, the appropriate key is inserted in the key hole of the lock assembly 28, and the key is turned in the opposite direction the key was turned to unlock the mechanism 20. This causes the rear surface 352 of the lock assembly 28 to rotate in the opposite direction, thereby causing the helical ramp 356 on the end surface 354 of the extending portion 332 of the lock plate 30 to ride up the surface 352. This causes the lock plate 30 to pivot forward, causing the recesses 334, 336 in the body portion 330 of the lock plate 30 to engage the lock portions 42, 52 of the paddles 40, 50. After the lock plate 30 has been pivoted into engagement with the lock portions 42, 52 of the paddles 40, 50, the paddles 40, 50 can not readily be actuated (i.e., lifted upward) to gain access to the console 22.

As described above, when the latch mechanism 20 is in the locked position, preferably the recesses 334, 336 in the lock plate 30 engage effectively the entire width of the lock portions 42, 52 of the paddles 40, 50. As a result of engaging a substantial width of the lock portion 42, 52 of each paddle 40, 50, the latch mechanism 20 is robust and a generally symmetrical loading condition on the paddles 40, 50 is achieved.

As discussed above, FIGS. 15–17 show the latch mechanism 20 attached to a console 22. FIG. 17 shows the console cover 24 and sub-compartment panel 26 opened, with the console cover 24 and sub-compartment panel disengaged from each other. Of course, it is possible to open the console cover 24 while leaving the sub-compartment panel 26 closed, and it is possible to open the sub-compartment panel 26 while the console cover 24 remains engaged with the sub-compartment panel 26.

While an embodiment of the present invention is shown and described, it is envisioned that those skilled in the art may devise various modifications without departing from the spirit and scope of the present invention.

What is claimed is:

1. A latch mechanism comprising: at least one paddle; and a lock plate which is swivelable into engagement with a lock portion of said at least one paddle, thereby generally locking said paddle in place, said lock portion of said at least one paddle having a width, said lock plate engageable with a substantial portion of said width of said lock portion of said at least one paddle, said lock portion of said at least one paddle including a retention ramp configured to engage corresponding structure on said lock plate, said corresponding structure on said lock plate comprising an inclined surface in a recess which is configured to receive said lock portion of said at least one paddle.

2. A latch mechanism comprising: at least one paddle; and a lock plate which is swivelable into engagement with a lock portion of said at least one paddle, thereby generally locking said paddle in place, said lock portion of said at least one paddle having a width, said lock plate engageable with a substantial portion of said width of said lock portion of said at least one paddle, said lock portion of said at least one paddle including a retention ramp configured to engage corresponding structure on said lock plate, said lock plate including an extending portion that provides a helical ramp which engages a lock assembly, wherein engagement between the lock assembly and helical ramp provides that the lock assembly is actuatable to cause said lock plate to swivel into or out of engagement with said lock portion of said at least one paddle.

3. A latch mechanism as recited in claim 2, wherein said lock plate is spring biased such that said helical ramp on said extending portion of said lock plate is biased into engagement with said lock assembly.

4. A latch mechanism as recited in claim 3, wherein a profile of a surface of said lock assembly is such that rotation of said lock assembly causes said helical ramp to ride up or down said surface of said lock assembly and effect pivoting of said lock plate.

5. A latch mechanism as recited in claim 3, wherein said latch mechanism includes two paddles which are configured to engage each other, and said lock plate is configured to engage lock portions on both paddles, thereby locking both paddles generally in place.

6. A latch mechanism of a console comprising: a first assembly attached to a cover of the console and a second assembly attached to a sub-compartment panel of the console, said first assembly including a first paddle having a lock portion and said second assembly including a second paddle having a lock portion; and a lock plate which is swivelable into engagement with the lock portions of the paddles, said lock plate engageable with a substantial portion of a width of the lock portions of each of said paddles.

7. A latch mechanism as recited in claim 6, wherein the lock portion of at least one of said paddles includes a retention ramp that is configured to engage corresponding structure on said lock plate.

8. A latch mechanism as recited in claim 7, said corresponding structure on said lock plate comprising an inclined surface in a recess which is configured to receive said lock portion.

9. A latch mechanism as recited in claim 8, said lock plate including an extending portion that provides a helical ramp which engages a lock assembly, wherein engagement between the lock assembly and helical ramp provides that the lock assembly is actuatable to cause said lock plate to swivel into or out of engagement with said lock portions of said paddles.

10. A latch mechanism as recited in claim 9, wherein said lock plate is spring biased such that said helical ramp on said extending portion of said lock plate is biased into engagement with said lock assembly.

11. A latch mechanism as recited in claim 10, wherein a profile of a surface of said lock assembly is such that rotation of said lock assembly causes said helical ramp to ride up or down said surface of said lock assembly and effect pivoting of said lock plate.

12. A latch mechanism comprising: a paddle; and a lock plate which is swivelable into engagement with a lock portion of said paddle, thereby generally locking said paddle in place, said lock portion including a retention ramp configured to engage corresponding structure on said lock plate, said corresponding structure on said lock plate comprising an inclined surface in a recess which is configured to receive said lock portion of said paddle.

13. A latch mechanism comprising: a paddle; and a lock plate which is swivelable into engagement with a lock portion of said paddle, thereby generally locking said paddle in place, said lock portion including a retention ramp configured to engage corresponding structure on said lock plate, said lock plate including an extending portion that provides a helical ramp which engages a lock assembly, wherein engagement between the lock assembly and helical ramp provides that the lock assembly is actuatable to cause said lock plate to swivel into or out of engagement with said lock portion of said paddle.

14. A latch mechanism as recited in claim 13, wherein said lock plate is spring biased such that said helical ramp on said extending portion of said lock plate is biased into engagement with said lock assembly.

15. A latch mechanism as recited in claim 14, wherein a profile of a surface of said lock assembly is such that rotation of said lock assembly causes said helical ramp to ride up or down said surface of said lock assembly and effect pivoting of said lock plate.

16. A latch mechanism as recited in claim 14, wherein said latch mechanism includes two paddles which are configured to engage each other, and said lock plate is configured to engage lock portions on both paddles, thereby locking both paddles generally in place.

17. A latch mechanism comprising: at least one paddle; and a lock plate which is swivelable into engagement with a lock portion of said at least one paddle, thereby generally locking said paddle in place, said lock portion of said at least one paddle having a width, said lock plate engageable with a substantial portion of said width of said lock portion of said at least one paddle, said lock plate including an extending portion that provides a helical ramp which engages a lock assembly, wherein engagement between the lock assembly and helical ramp provides that the lock assembly is actuatable to cause said lock plate to swivel into or out of engagement with said lock portion of said at least one paddle.

18. A latch mechanism as recited in claim 17, wherein said lock plate is spring biased such that said helical ramp on said extending portion of said lock plate is biased into engagement with said lock assembly.

19. A latch mechanism as recited in claim 18, wherein a profile of a surface of said lock assembly is such that rotation of said lock assembly causes said helical ramp to ride up or down said surface of said lock assembly and effect pivoting of said lock plate.

20. A latch mechanism as recited in claim 18, wherein said latch mechanism includes two paddles which are configured to engage each other, and said lock plate is configured to engage lock portions on both paddles, thereby locking both paddles generally in place.

21. A latch mechanism comprising: at least one paddle; and a lock plate which is swivelable into engagement with a lock portion of said at least one paddle, thereby generally locking said paddle in place, said lock portion of said at least one paddle including a retention ramp configured to engage corresponding structure on said lock plate, said corresponding structure on said lock plate comprising an inclined surface in a recess which is configured to receive said lock portion of said at least one paddle.

22. A latch mechanism comprising: at least one paddle; and a lock plate which is swivelable into engagement with a lock portion of said at least one paddle, thereby generally locking said paddle in place, said lock portion of said at least one paddle including a retention ramp configured to engage corresponding structure on said lock plate, said lock plate including an extending portion that provides a helical ramp which engages a lock assembly, wherein engagement between the lock assembly and helical ramp provides that the lock assembly is actuatable to cause said lock plate to swivel into or out of engagement with said lock portion of said at least one paddle.

23. A latch mechanism as recited in claim 22, wherein said lock plate is spring biased such that said helical ramp on said extending portion of said lock plate is biased into engagement with said lock assembly.

24. A latch mechanism as recited in claim 23, wherein a profile of a surface of said lock assembly is such that rotation of said lock assembly causes said helical ramp to ride up or down said surface of said lock assembly and effect pivoting of said lock plate.

25. A latch mechanism as recited in claim 23, wherein said latch mechanism includes two paddles which are configured to engage each other, and said lock plate is configured to engage lock portions on both paddles, thereby locking both paddles generally in place.

26. A latch mechanism comprising: at least one paddle; and a lock plate which is swivelable into engagement with a lock portion of said at least one paddle, thereby generally locking said paddle in place, said lock portion of said at least one paddle having a width, said lock plate engageable with a substantial portion of said width of said lock portion of said at least one paddle, said lock plate including an extending portion that provides a helical ramp which engages a lock assembly, wherein engagement between the lock assembly and helical ramp provides that the lock assembly is actuatable to cause said lock plate to swivel into or out of engagement with said lock portion or said at least one paddle.

27. A latch mechanism as recited in claim 26, wherein said lock plate is spring biased such that said helical ramp on said extending portion of said lock plate is biased into engagement with said lock assembly.

28. A latch mechanism as recited in claim 27, wherein a profile of a surface of said lock assembly is such that rotation of said lock assembly caused said helical ramp to ride up or down said surface of said lock assembly and effect pivoting of said lock plate.

29. A latch mechanism as recited in claim 27, wherein said latch mechanism includes two paddles which are configured to engage each other, and said lock plate is configured to engage lock portions on both paddles, thereby locking both paddles generally in place.

* * * * *

UNITED STATES PATENT AND TRADEMARK OFFICE

CERTIFICATE OF CORRECTION

PATENT NO. : 6,513,354 B2

DATED : February 4, 2003

INVENTOR(S) : Patrick H. Predd and Kevin Jordan

It is certified that error appears in the above-identified patent and that said Letters Patent is hereby corrected as shown below:

Column 12,
Line 39, "caused" should be -- causes --

Signed and Sealed this

Twenty-ninth Day of July, 2003

JAMES E. ROGAN
*Director of the United States Patent and Trademark Office*